United States Patent [19]

Little

[11] Patent Number: 5,460,465
[45] Date of Patent: Oct. 24, 1995

[54] RAILCAR LOAD BELT TIE-DOWN APPARATUS

[75] Inventor: Heward C. Little, North Vancouver, Canada

[73] Assignee: Westran Holdings Limited, British Columbia, Canada

[21] Appl. No.: 280,499

[22] Filed: Jul. 25, 1994

[51] Int. Cl.[6] ............................. B60P 7/08; B61D 45/00
[52] U.S. Cl. ............................ 410/100; 410/34; 410/97
[58] Field of Search .................... 410/32, 34, 36, 410/37, 50, 85, 97, 100, 103, 109, 112, 113; 24/68 CD; 248/499

[56] References Cited

U.S. PATENT DOCUMENTS

| | | |
|---|---|---|
| 546,518 | 9/1895 | Fountain . |
| 3,312,181 | 4/1967 | Davidson . |
| 3,407,753 | 10/1968 | Stafford ........................... 410/100 X |
| 3,428,331 | 2/1969 | Morgan et al. . |
| 3,697,045 | 10/1972 | Farley . |
| 4,247,235 | 1/1981 | Sunesson . |
| 4,358,232 | 11/1982 | Griffith ............................ 410/100 |
| 4,369,009 | 1/1983 | Fulford ........................... 410/100 X |
| 4,382,736 | 5/1983 | Thomas . |
| 4,900,203 | 2/1990 | Pope ............................... 24/68 C D X |
| 5,024,567 | 6/1991 | Dominguez et al. ............... 410/32 X |

FOREIGN PATENT DOCUMENTS

| | | | |
|---|---|---|---|
| 1227533 | 4/1986 | U.S.S.R. ........................... | 410/34 |

Primary Examiner—Michael S. Huppert
Assistant Examiner—Stephen Gordon
Attorney, Agent, or Firm—Oyen Wiggs Green & Mutala

[57] ABSTRACT

Apparatus for tying down a load on a railcar having a floor extending between opposed side sills. At each one of a plurality of intervals spaced along the railcar a belt anchor is recessed beneath the floor, adjacent and inwardly of one of the side sills. A first aperture is provided in the floor, above the belt anchor. A belt router is also recessed beneath the floor, adjacent and inwardly of the opposite side sill and at a point transversely opposite the belt anchor. A second aperture is provided in the floor, above the belt router. A belt winder is mounted on the opposite side sill, in alignment with the belt anchor and the belt router. One end of a belt is fixed to the belt anchor, with the belt's opposite end is passed through the first aperture, over the load, through the second aperture, through the belt router and through a third aperture in the opposite side sill for engagement and tensioning of the belt by the belt winder. Advantageously, for each adjacent pair of the aforesaid intervals, the belt anchor, the belt router and the belt winder are reversed in position relative to the side sills.

9 Claims, 8 Drawing Sheets

RAILCAR LOAD BELT TIE-DOWN APPARATUS

FIELD OF THE INVENTION

This application pertains to a system for tying down loads on railcars. A plurality of belts are tied across the load between opposite sides of and at spaced intervals along the railcar.

BACKGROUND OF THE INVENTION

Loads such as packaged lumber, pipe, etc. shipped via open railcar must be securely tied-down to the railcar for shipment in compliance with regulations set by the railways. Conventionally, the load is carefully arranged in accordance with such regulations and tied down to the railcar surface using steel strapping and dunnage. Typically, about U.S. $200 worth of strapping and dunnage, about four man-hours of manual labor and about two machine-hours of automated labor (i.e. employing a forklift) are consumed in the tie-down operation. The strapping and dunnage adds about 1,500 pounds in weight, which must be taken into account in planning the railcar loading operation. The strapping and dunnage comprising this extra weight is scrapped when the railcar reaches its destination and the load is removed.

Newer style "center beam" railcars are provided with an integral cable-stayed load tie-down system. Such cars have a vertically extending divider which runs longitudinally along the railcar's center line. However, center beam railcars are subject to several disadvantages. For example, the divider in a center beam car precludes use of such cars in rail yards which are equipped to load or unload cars from only one side of the car. (It is not possible to load or unload only one side of a center beam car at a time, since this could cause the car to tip over. Both sides must be evenly loaded or unloaded.) Another disadvantage is that some rail yard operators use overhead cranes for loading and unloading. Center beam railcars have a roof member atop the divider which restricts load height and prevents usage of overhead cranes with such cars.

During the course of loading or unloading a center beam railcar, one or more workers must climb atop the car to attach or release components of the car's cable-stayed load tie-down system. This presents a potential safety hazard which the present invention avoids by allowing all railcar loading or unloading operations to be performed from the ground adjacent the railcar. A further potential safety hazard of the center beam railcar cable-stayed load tie-down system is its use of loose, heavy metal components such as corner brackets which must be manually positioned on the top corners of loads placed on the car before they are fixed in place. Such components may be inadvertently dropped while they are being installed, presenting serious risk of injury to persons below. The present invention does not require workers to clamber atop the loaded railcar, nor does it require heavy, loose components which may be dropped as aforesaid.

The older bulkhead style cars mentioned above do not have center dividers. By contrast, such cars have a simple flat deck which extends between a pair of transverse, vertical bulkheads located at opposed ends of the railcar. The present invention adapts such cars for the shipment of packaged lumber and similar loads in a manner which substantially reduces the need for metal strapping and dunnage, thereby reducing costs and redundant weight on the car, and minimizing the problem of having to dispose of large amounts of scrapped metal strapping and dunnage.

The invention also simplifies the railcar loading and unloading operation, which again reduces costs. Because bulkhead railcars can be loaded or unloaded from either side, and have no roof members, they are not subject to the aforementioned disadvantages of center beam cars. Further, the invention does not interfere with any traditional usage of bulkhead cars, but remains available for use in any load tie-down situation. Thus, bulkhead cars adapted in accordance with the invention can be used in "two-way" mode, to ship loads such as packaged lumber in one direction and different loads such as pipe in the return direction. This helps reduce non-revenue generating "empty miles" in which empty railcars travel in the return direction.

SUMMARY OF THE INVENTION

In accordance with the preferred embodiment, the invention provides a system for tying down a load on a railcar having a floor extending between opposed side sills. At each one of a plurality of intervals spaced along the railcar a belt anchor is recessed beneath the floor, adjacent and inwardly of one of the side sills. A first aperture is provided in the floor, above the belt anchor. A belt routing means is also recessed beneath the floor, adjacent and inwardly of the opposite side sill and at a point transversely opposite the belt anchor. A second aperture is provided in the floor, above the belt routing means. A belt winding means is mounted on the opposite side sill, in alignment with the belt anchor and the belt routing means. One end of a belt is fixed to the belt anchor, with the belt's opposite end being passed through the first aperture, over the load, through the second aperture, through the belt routing means and through a third aperture in the opposite side sill for engagement and tensioning of the belt by the belt winding means. Advantageously, for each adjacent pair of the aforesaid intervals, the belt anchor, the belt routing means and the belt winding means are reversed in position relative to the side sills.

The belt anchor and the belt routing means are further respectively located inwardly of minimum permitted outwardly protruding edges of the load, such minima being governed by railcar loading "rules" promulgated by various parties including the railways, parties whose goods are shipped by rail, governmental regulatory bodies, etc.

The belt anchor may take the form of an anchor pin having a mounting means for supporting the anchor pin. The mounting means is affixed to a frame member of the railcar such that the anchor pin extends parallel to the car's longitudinal axis. The belt is looped at one end for affixation over the anchor pin.

The belt routing means may take the form of one or more belt routing pins and a mounting means for supporting the belt routing pins. The mounting means is affixed to another frame member of the railcar such that the belt routing pins extend parallel to the car's longitudinal axis. The belt routing pin mounting means supports the belt routing pins at intervals which are spaced transversely relative to the car's longitudinal axis.

The belt winding means may be a ratchet winch. Preferably, the third aperture and the belt winding means are located beneath the belt routing means.

The belt is preferably made of PVC impregnated polyester.

DETAILED DESCRIPTION OF THE PREFERRED EMBODIMENT

Figure 3:
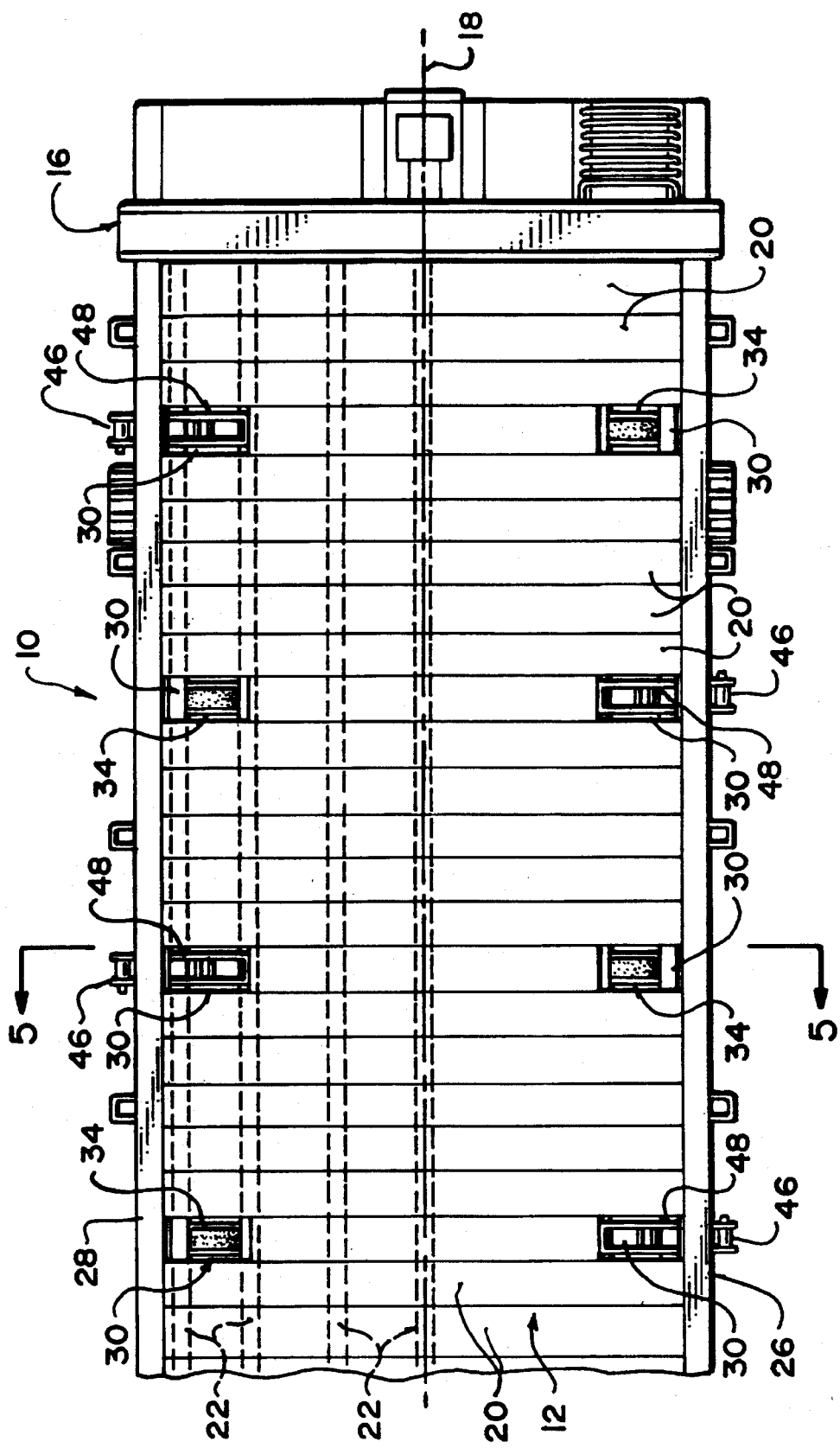
FIG. 3 is a partial plan view showing one end of a railcar equipped to receive a load for tying down in accordance with the invention, but not showing the load.

The drawings depict one common style of bulkhead railcar 10 having a flat deck 12 which extends between a pair of vertical bulkheads 14, 16 located at opposed ends of railcar 10. Bulkheads 14, 16 extend transversely with respect to the longitudinal axis 18 (FIG. 3) of railcar 10. Deck 12 is surfaced with a plurality of planks 20 fixed atop deck support stringers 22 which are in turn supported by transversely extending beams 24. Side sills 26, 28 are fixed to the outer ends of beams 24 and extend longitudinally along the outer upper edges of railcar 10, flush with deck 12.

Other styles of bulkhead railcars exist. For example, instead of planks 20, some bulkhead railcars have nailable steel floors. Persons skilled in the art are generally familiar with the different available styles of bulkhead railcars and will understand that the present invention can easily be adapted to work with all styles.

Figure 1:
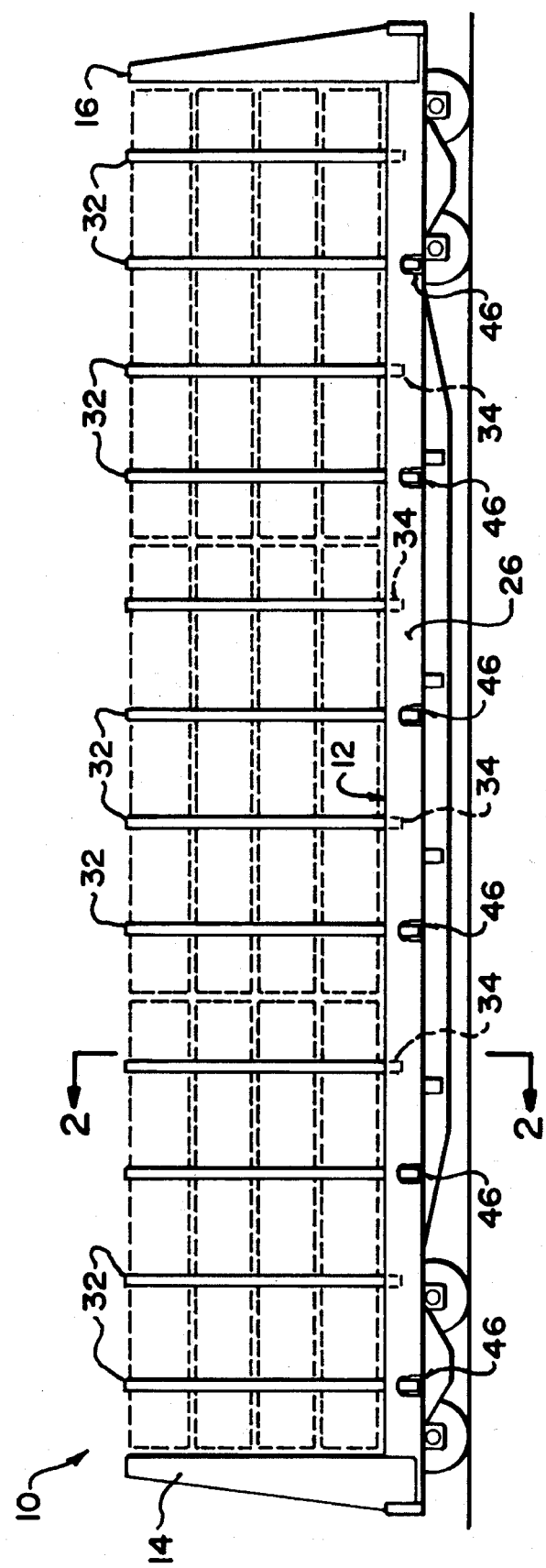
FIG. 1 is a side elevation view of a railcar having a load tied down in accordance with the invention.

In accordance with the present invention, a plurality of apertures 30 are provided in deck 12 by cutting away sections of planking 20 at pairs of transversely opposed intervals which are spaced along railcar 10 adjacent the respective side sills 26, 28. As hereinafter explained in greater detail, at each transversely opposed pair of apertures 30 a belt is anchored beneath one of the apertures and is extended upwardly through deck 12, over the load (shown schematically in FIGS. 1 and 2), and downwardly through the opposite deck aperture to a belt tightener which tensions the belt against the load. One belt is provided at each transversely opposed pair of apertures. This facilitates secure tying of the load down on railcar 10.

Figure 5A:
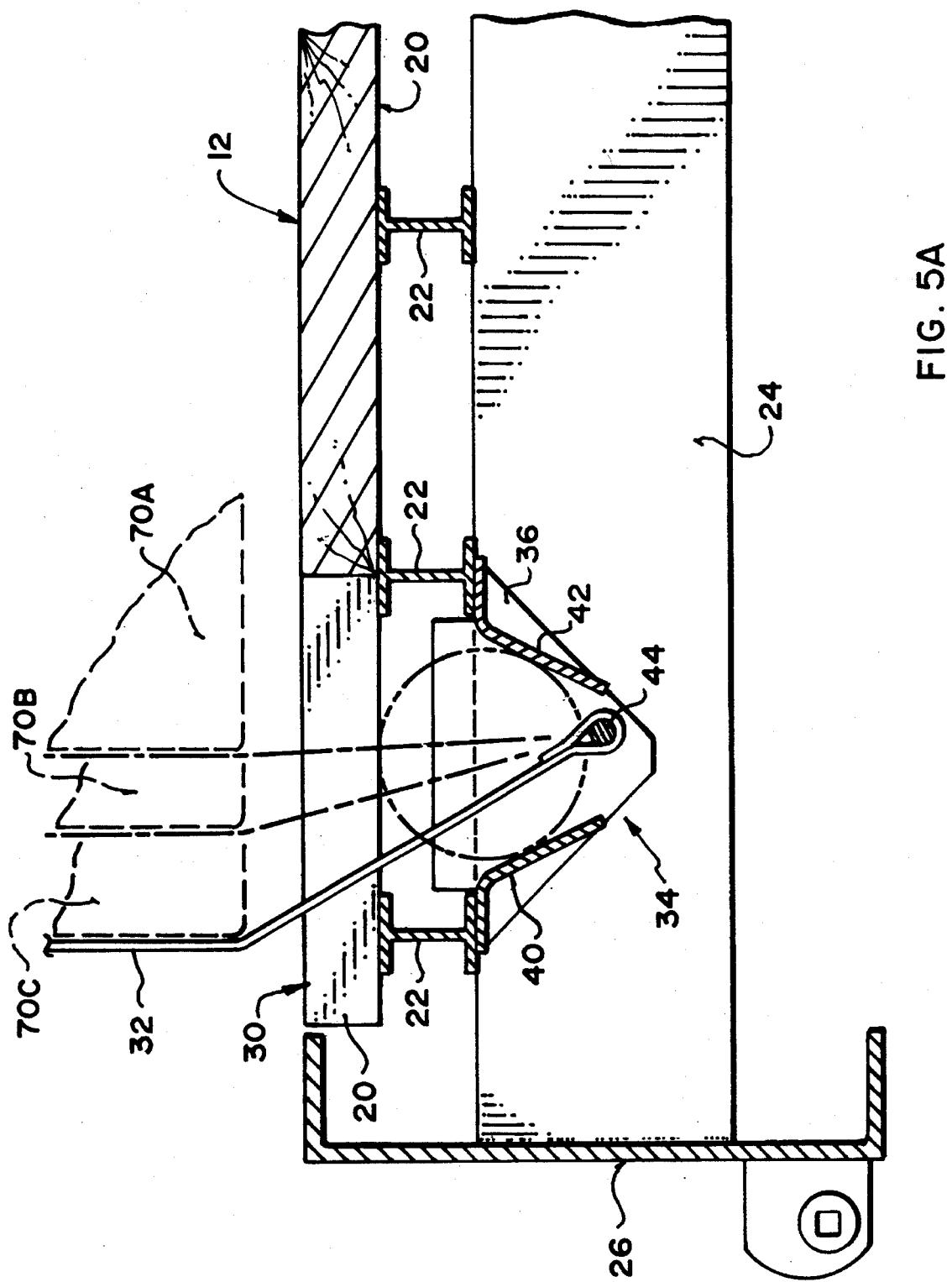
FIGS. 5A and 5B together comprise a cross-sectional view taken with respect to line 5—5 of FIG. 3, showing different load widths and belt routing accommodated by the invention.
Figure 8A:
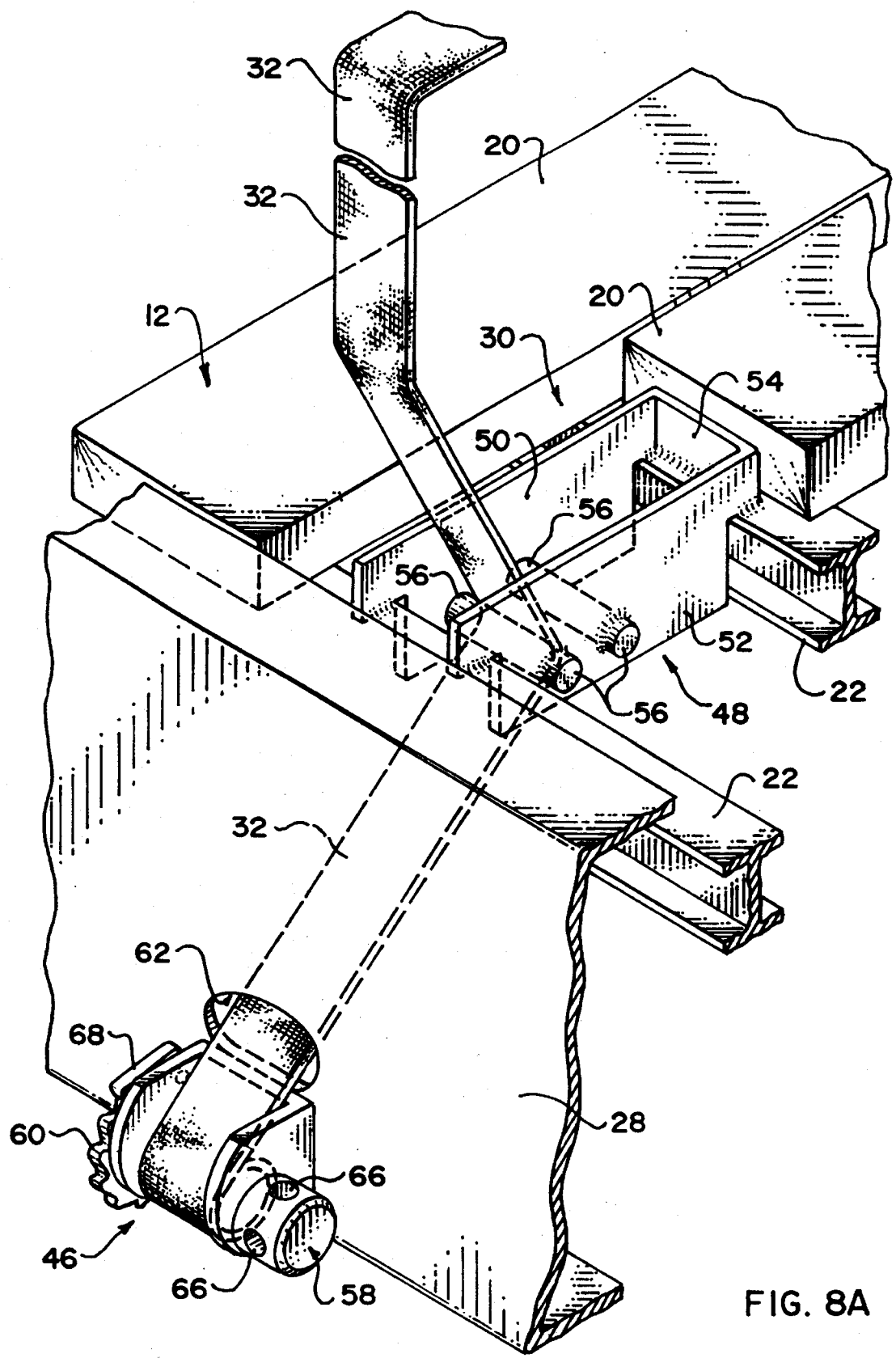
FIGS. 8A and 8B are isometric illustrations showing how the belt, belt anchor and belt tightening means cooperate in tying a load down on the railcar.
Figure 8B:
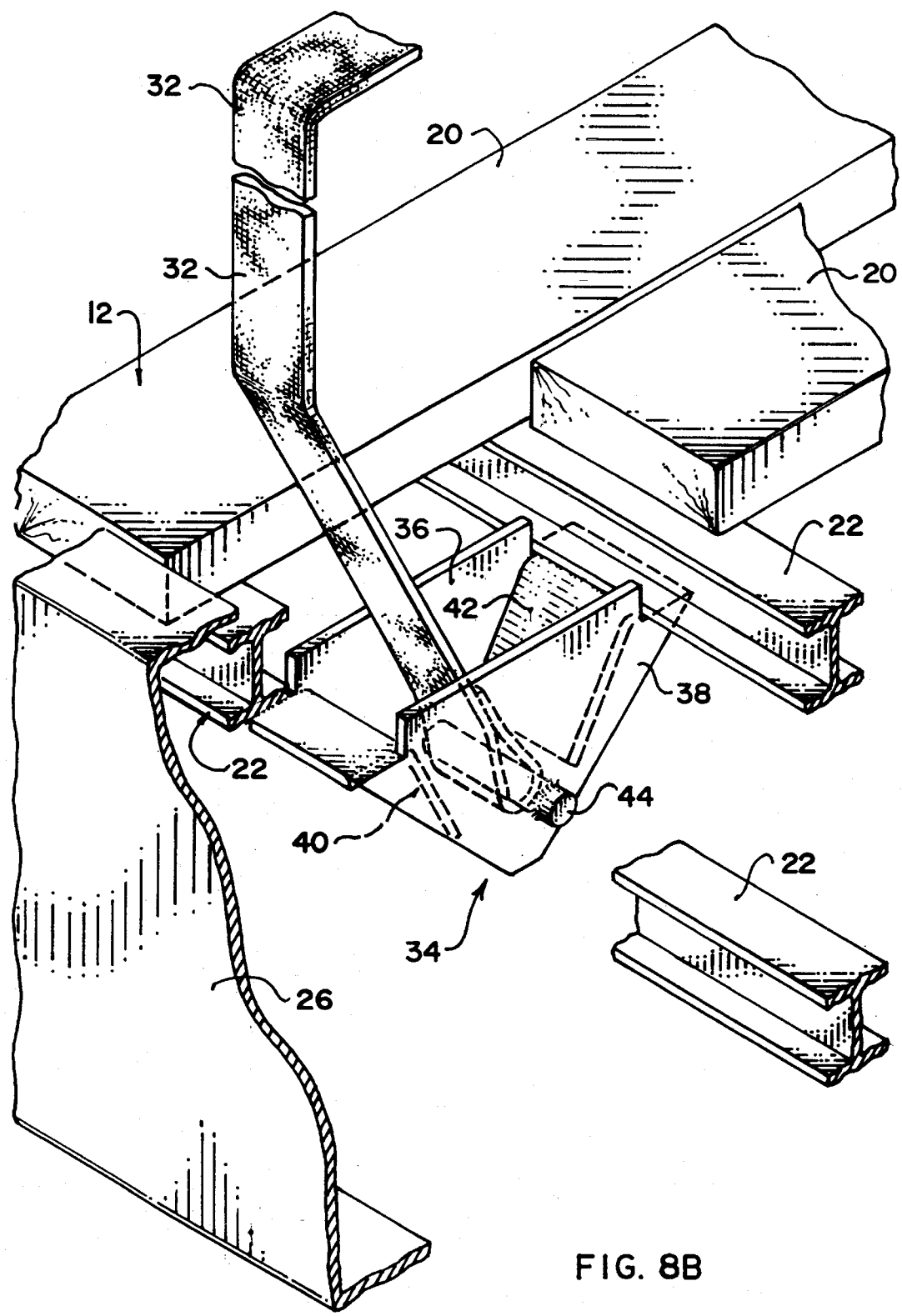

FIGS. 5A and 8B show PVC-impregnated belt 32 having one end retained by a belt anchoring means 34, which comprises a compartment made up of a pair of steel plates 36, 38 fixed in rigid parallel relationship by welding end plates 40, 42 therebetween. Horizontally protruding portions of end plates 40, 42 are welded to the undersides of an adjacent pair of stringers 22, beneath one of the apertures 30. An anchor pin 44 is rigidly fastened by welding opposed ends thereof to plates 36, 38 respectively. (Alternatively, pin 44 may be rotatably mounted between plates 36, 38.) One end of belt 32 is securely fastened over pin 44, for example by stitching the belt end firmly against the belt to form a closed loop, then passing pin 44 through the loop and mounting pin 44 between plates 36, 38 as aforesaid.

Figure 5B:
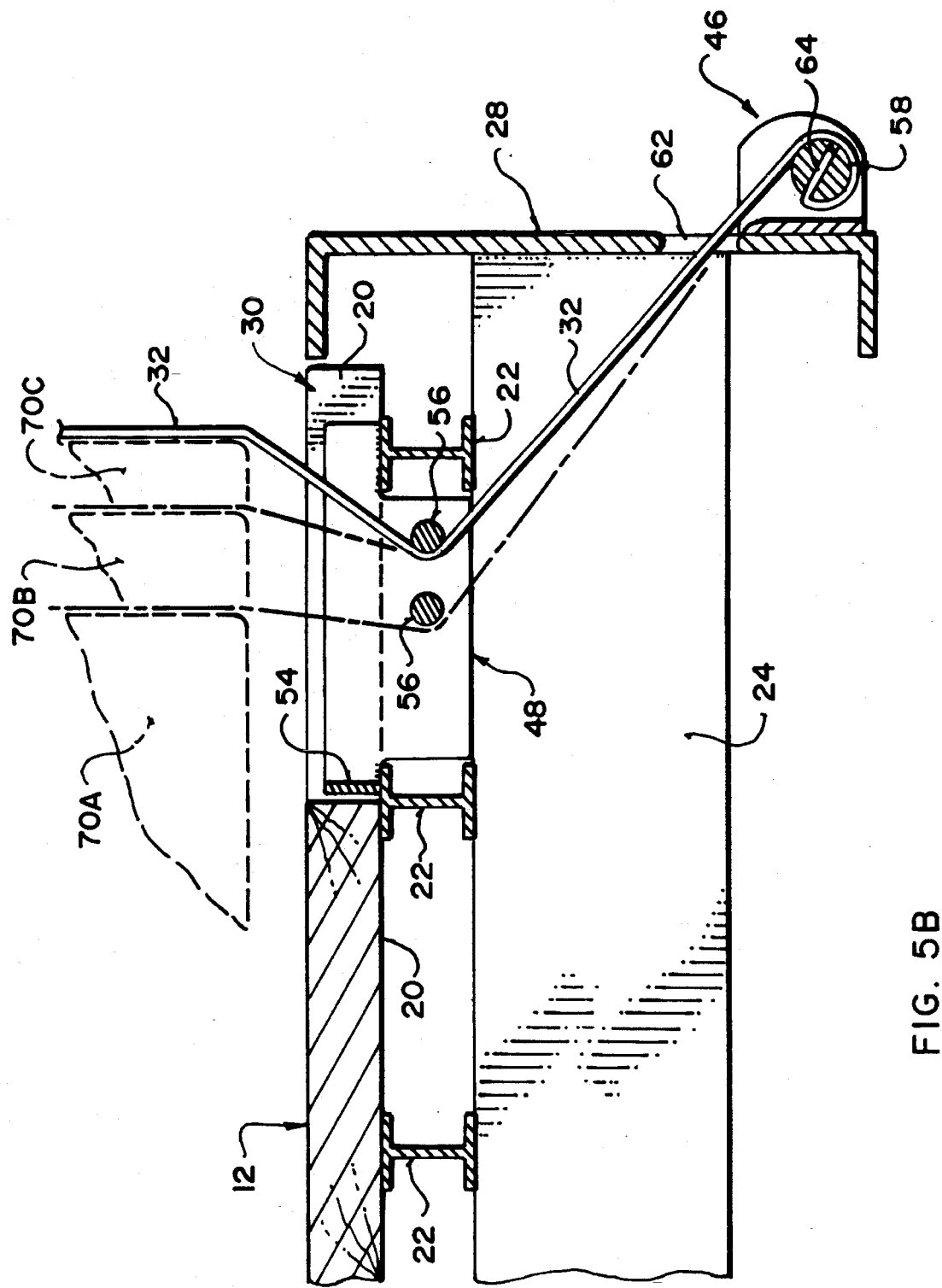

The preferred belt tightening means 46 is illustrated in FIGS. 5B and 8A which additionally show the preferred belt routing means 48. In particular, belt routing means 48 comprises a pair of steel plates 50, 52 held in rigid spaced parallel relationship by welding end plate 54 and one or more belt routing pins 56 therebetween. (Alternatively, pins 56 may be rotatably mounted between plates 50, 52.) The opposed ends of plates 50, 52 are notched to facilitate welding of plates 50, 52 atop an adjacent pair of stringers 22 thereby firmly fastening belt routing means 48 beneath one of the apertures 30, in transverse opposition to one of the belt anchoring means 34 discussed above. Belt routing pins 56 extend parallel to one another and parallel to the car's longitudinal axis 18.

Figure 7:
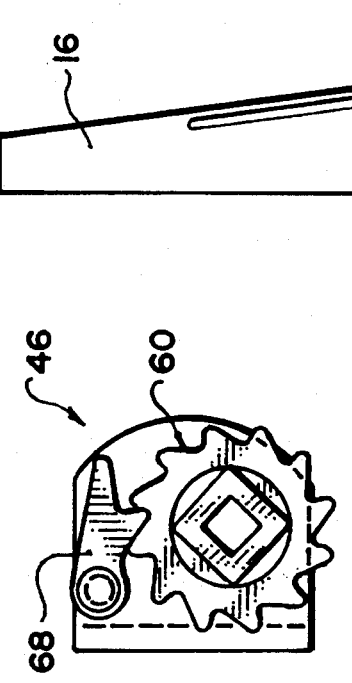
FIG. 7 is an end elevation view of the belt tightening means shown in FIG. 6.
Figure 6:
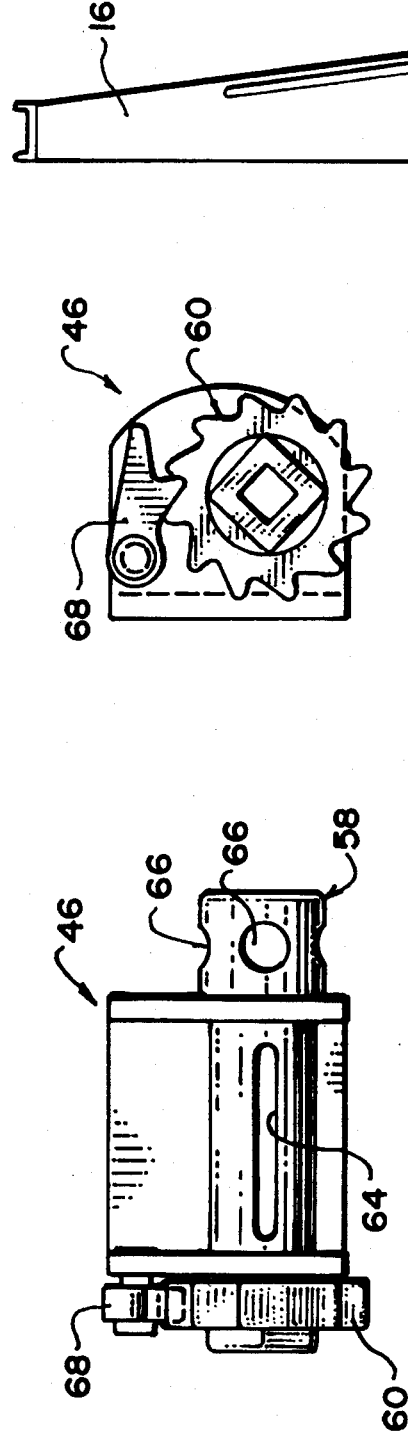
FIG. 6 is a side elevation view of a belt tightenings means.
Figure 4:
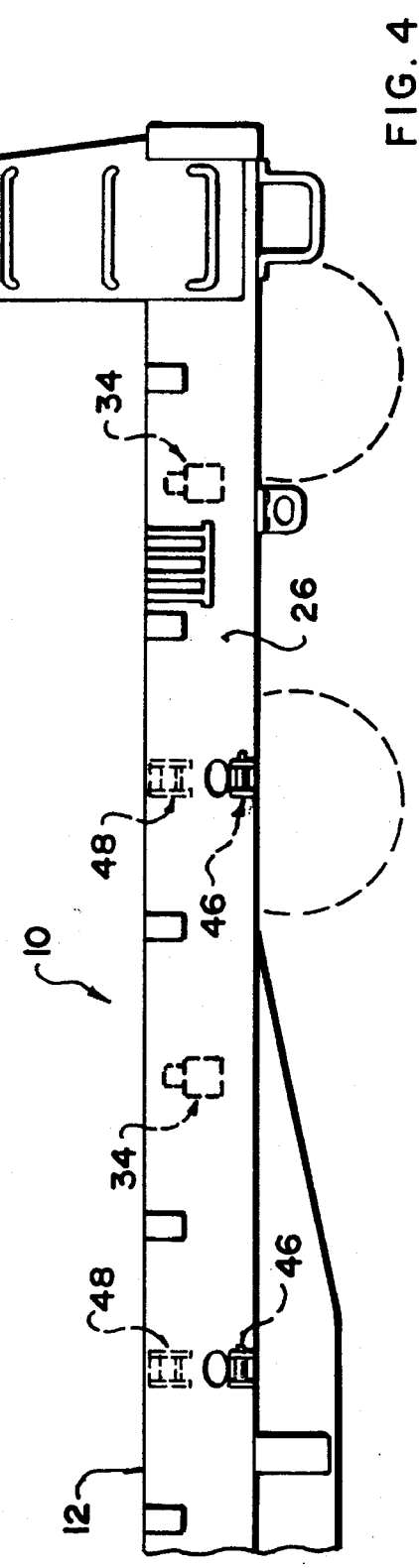
FIG. 4 is a side elevation view of the railcar end shown in FIG. 3.

Belt winding means 46 (also seen in FIGS. 6 and 7) comprises a winch 58 having a ratchet mechanism 60. After belt 32 is anchored and extended over the load as aforesaid, the belt's free end is fed downwardly through aperture 30 depicted in FIG. 8A, over a selected one of belt routing pins 56, through aperture 62 in car side sill 28 and into slot 64 of winch 58. Belt 32 is tensioned by rotating winch 58 to wind belt 32 thereonto. A steel bar may be inserted into one of the winch apertures 66 to provide sufficient leverage for tensioning belt 32. Ratchet mechanism 60 maintains the tension as the belt is wound upon winch 58. In order to relieve the tension for release of belt 32 and removal of the load from railcar 10, ratchet pawl 68 is lifted upwardly away from the teeth of ratchet mechanism 60 to enable free reverse rotation of winch 58 and removal of belt 32 therefrom.

Once removed as aforesaid, the free end of belt 32 may be rolled upon itself to form a coil which can be stored within the pocket formed by plates 36, 38 and end plates 40, 42 as illustrated by the dashed circular outline in FIG. 5A. The opposite, looped end of belt 32 remains fixed over pin 44 as aforesaid. Note that the bottom end of the belt storage pocket remains open to facilitate drainage of water or debris therefrom.

FIGS. 5A and 5B illustrate, in dashed outline, the lowermost outer corner portions 70a, 70b, 70c of different loads placed atop deck 12 (supporting dunnage ordinarily placed between deck 12 and the load is not shown). As seen in FIG. 5B, for either one of load corner positions 70b or 70c, belt 32 may be routed over the rightmost one of belt routing pins 56 and still maintain the flat surface of belt 32 firmly against the vertically extending outer face of the load. But, at load corner position 70a, belt 32 is fed over the leftmost one of belt routing pins 56 to maintain flush engagement of the surface of belt 32 with the vertically extending side of the load. If the rightmost one of belt routing pins 56 were used in the case of load corner 70a, a gap would remain between the belt and the vertically extending side of the load, preventing proper retention of the load along its vertically extending side and subjecting the belt to excessive forces at its intersection with the top corner of the load.

Figure 2:
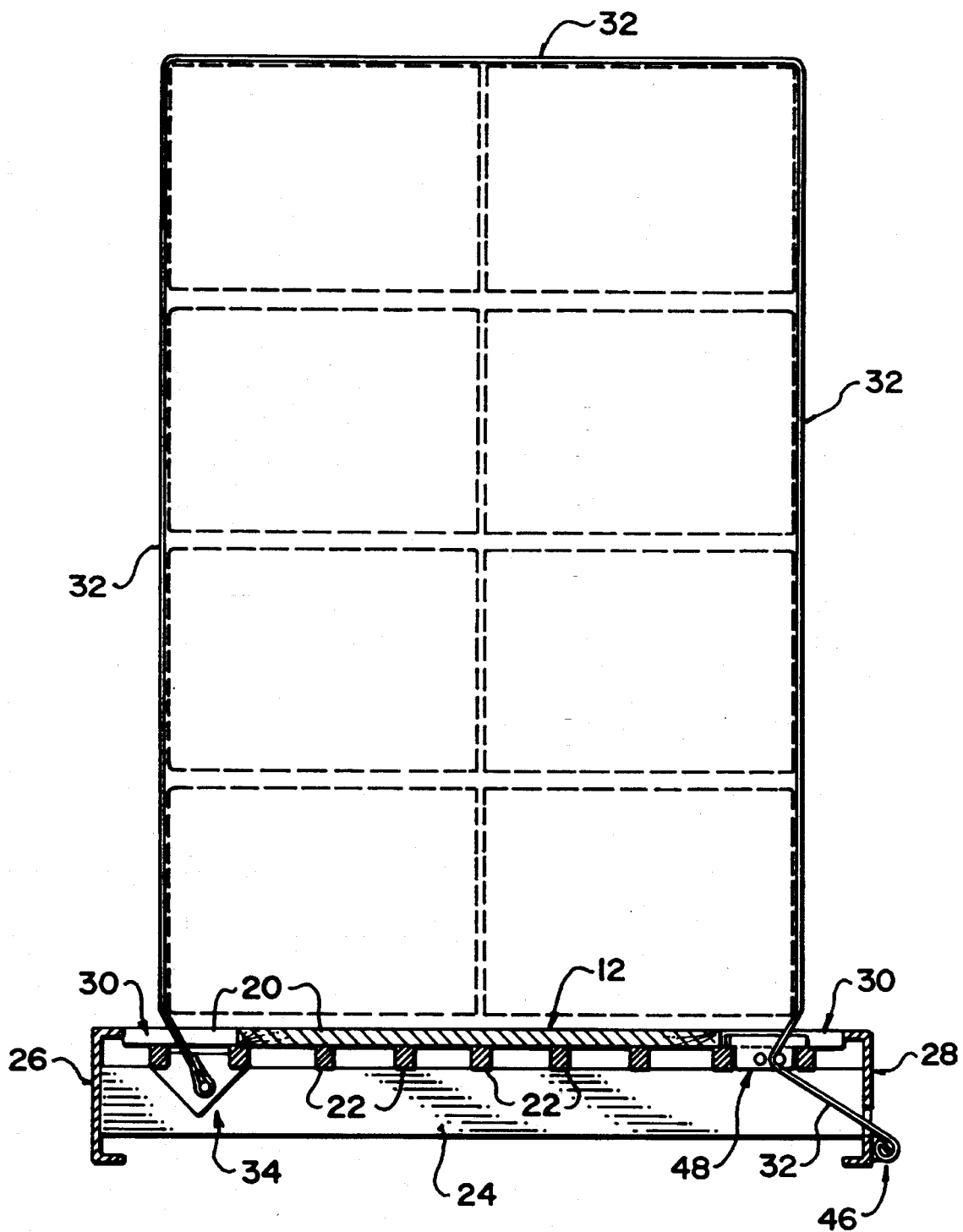
FIG. 2 is a cross-sectional view taken with respect to line 2—2 of FIG. 1.

As seen in FIG. 5A, anchor pin 44 acts as a pivot point, enabling belt 32 to lie within a range of angles relative to the lowermost corner of the load located above pin 44, thereby maintaining belt 32 flush against the vertically extending side of the load above pin 44. FIG. 2 illustrates the preferred arrangement in which belt 32 remains flush against the sides and top of the load at all points along both sides and across the top of the load. This is achieved by ensuring that the operative parts of both belt anchoring means 34 and belt routing means 48 are respectively located inwardly of the minimum permitted outwardly protruding edges of the particular load.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for tying down a load comprising:
   (a) a pair of opposed outer side sills,
   (b) a load floor extending between the side sills, and
   (c) a plurality of tie-down assemblies spaced at a plurality of locations along the side sills,
      each said assembly comprising:
      a belt anchor recessed at a first point beneath said floor and between said sills, immediately adjacent and inward of one of said outer side sills,
      a first aperture in said floor, above said belt anchor,
      belt routing means recessed at a second point beneath said floor and between said sills, immediately adjacent and inward of the other side sill opposite said one outer side sill and in opposed alignment with said belt anchor,
      a second aperture in said floor, above said belt routing means,
      a third aperture in a vertical wall of said other side sill and in alignment with said belt routing means and said belt anchor,
      belt winding means mounted at a third point on an outer facing surface of said other side sill, adjacent said third aperture and in alignment with said belt anchor and said belt routing means, and
      a belt having one end affixable to said belt anchor and an opposite end extendible through said first aperture and above said floor, over said load, through said second aperture and beneath said floor, around said belt routing means, through said third aperture, and into engagement with said belt winding means such that said belt may be tensioned by said belt winding means wherein said belt may remain flush against a top surface and opposed side surfaces of said load during tie-down.

2. A system as defined in claim 1, wherein, for each adjacent one of said locations, said first, second and third points are reversed relative to said respective side sills.

3. A system as defined in claim 1, wherein said belt anchor and said belt routing means are further respectively locatable inwardly of minimum predefined locations of outwardly protruding edges of said load.

4. A system as defined in claim 2, wherein:
   (a) said belt anchor further comprises:
      (i) an anchor pin;
      (ii) anchor pin mounting means for supporting said anchor pin and for affixation to a frame member of said floor for extension of said anchor pin parallel to a longitudinal axis of said floor; and,
   (b) said belt is looped at said one end over said anchor pin.

5. A system as defined in claim 4, wherein said belt anchor further comprises a pocket for storing said belt when said belt is not extended over said load.

6. A system as defined in claim 4, wherein said belt routing means further comprises:
   (a) one or more belt routing pins; and,
   (b) belt routing pin mounting means for supporting said one or more belt routing pins and for affixation to another frame member of said floor for extension of said one or more belt routing pins parallel to said longitudinal axis of said floor.

7. A system as defined in claim 6, wherein said belt routing pin mounting means supports said one or more belt routing pins at locations which are spaced transversely relative to said longitudinal axis.

8. A system as defined in claim 6, wherein:
   (a) said belt winding means further comprises a ratchet winch; and,
   (b) said third aperture and said belt winding means are located beneath said belt routing means.

9. A system as defined in claim 6, wherein said belt is made of PVC impregnated polyester.

\* \* \* \* \*